Jan. 19, 1954   C. MOTT   2,666,834
WELDING MACHINE
Filed June 24, 1952   3 Sheets-Sheet 1

Inventor
Chester Mott, deceased,
By: L. A. Mott, executor
Schneider & Dressler, Attys.

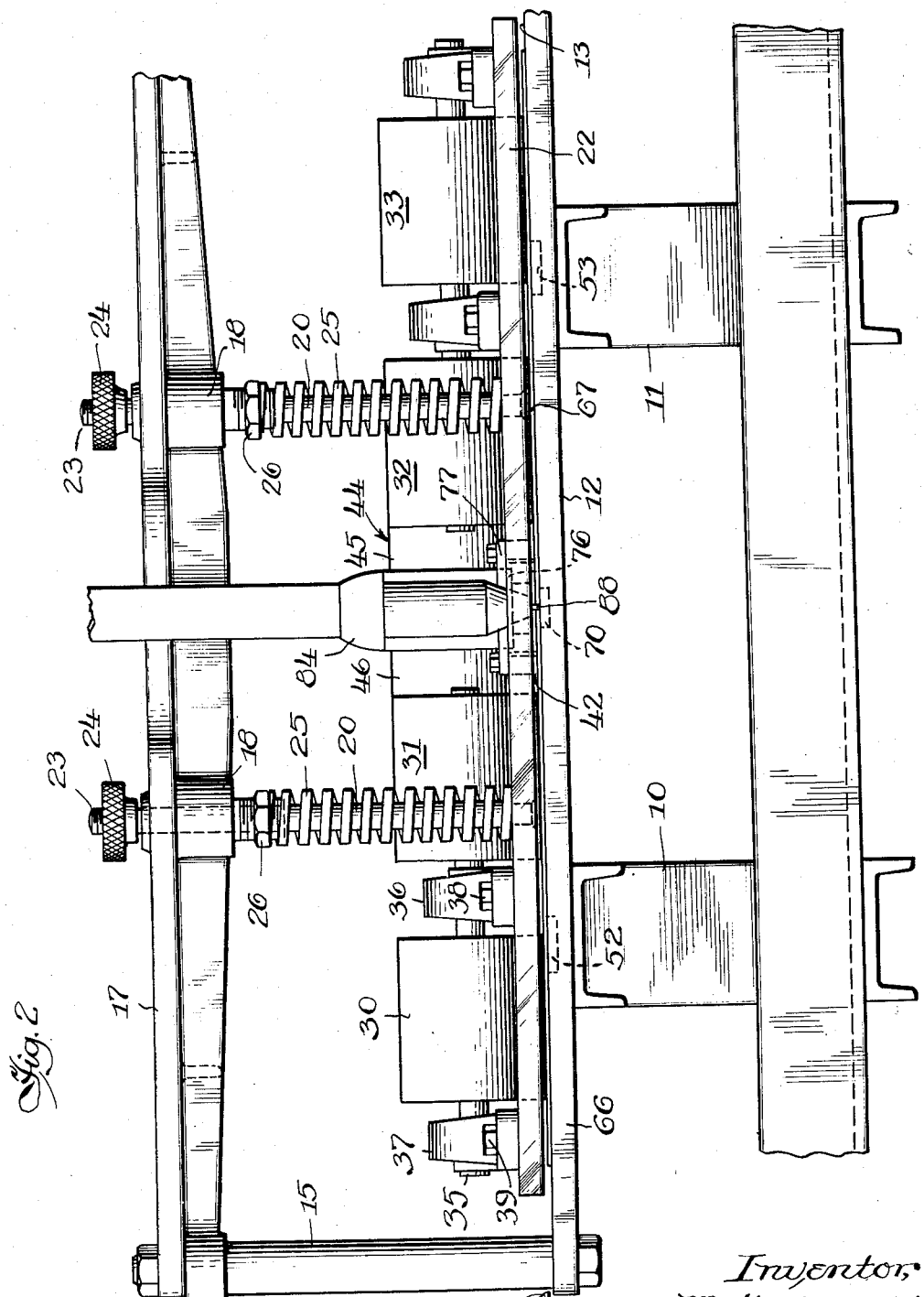

Jan. 19, 1954 C. MOTT 2,666,834
WELDING MACHINE
Filed June 24, 1952 3 Sheets-Sheet 3
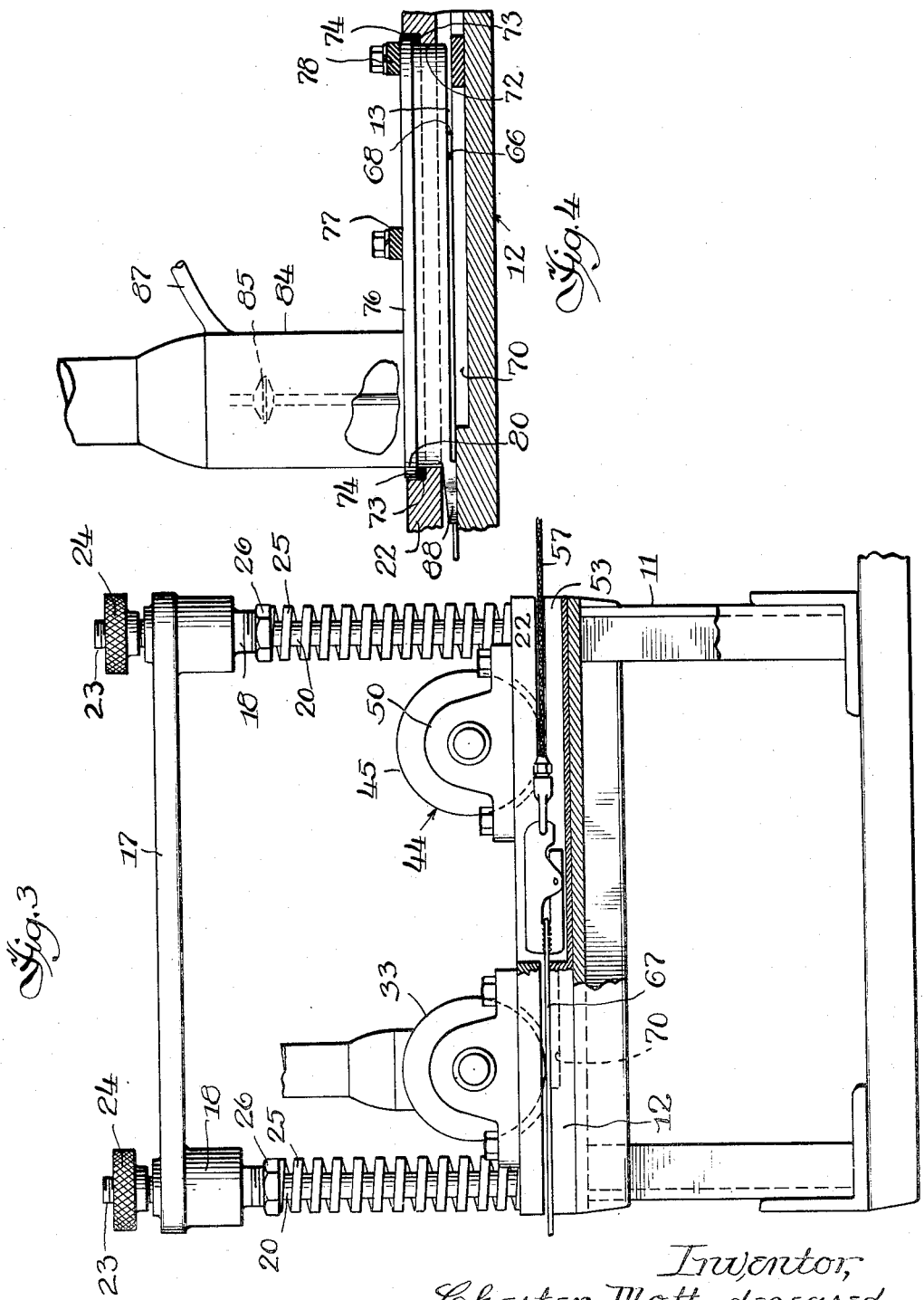
Inventor,
Chester Mott, deceased,
By: G. A. Mott, Executor.
By: Schneider & Dressler, Attys.

Patented Jan. 19, 1954

2,666,834

UNITED STATES PATENT OFFICE 2,666,834

WELDING MACHINE

Chester Mott, deceased, late of Evanston, Ill., by George A. Mott, executor, Evanston, Ill., assignor to Fansteel Metallurgical Corporation, a corporation of New York Application June 24, 1952, Serial No. 295,307

13 Claims. (Cl. 219—8)

This invention relates to a welding machine, and is particularly adapted for butt welding flat sheets having extensive area.

The machine of the present invention may be used for all kinds of butt welding, but it is particularly useful in connection with welding under inert atmospheres. Thus, for example, in butt welding of tantalum, stainless steel, and even ordinary metals such as sheet iron, it may be desirable to provide an inert atmosphere around the weld region and around the hot weld. Such atmospheres tend to promote good welds. In butt welding of large thin sheets of metal, considerable difficulty is experienced in controlling the metal so that proper welding can occur. It is, of course, essential that the metal be supported in the region of the weld so that proper control over the relative positions of the metal sheets may be maintained.

A machine embodying the present invention is characterized by simplicity and may be used under the most adverse conditions, such as, for example, obtain in butt welding of tantalum. An exemplary embodiment of the invention will be described in connection with the drawings, it being understood, however, that substantial variations and modifications may be made without departing from the spirit of the invention. Referring therefore to the drawings:

Figure 2 is a front elevation of the machine shown in Figure 1;

Figure 3 is a side view with certain parts broken away of the machine shown in Figures 1 and 2; and Figure 4 is a sectional detail on line 4—4 of Figure 1.

Figure 1:
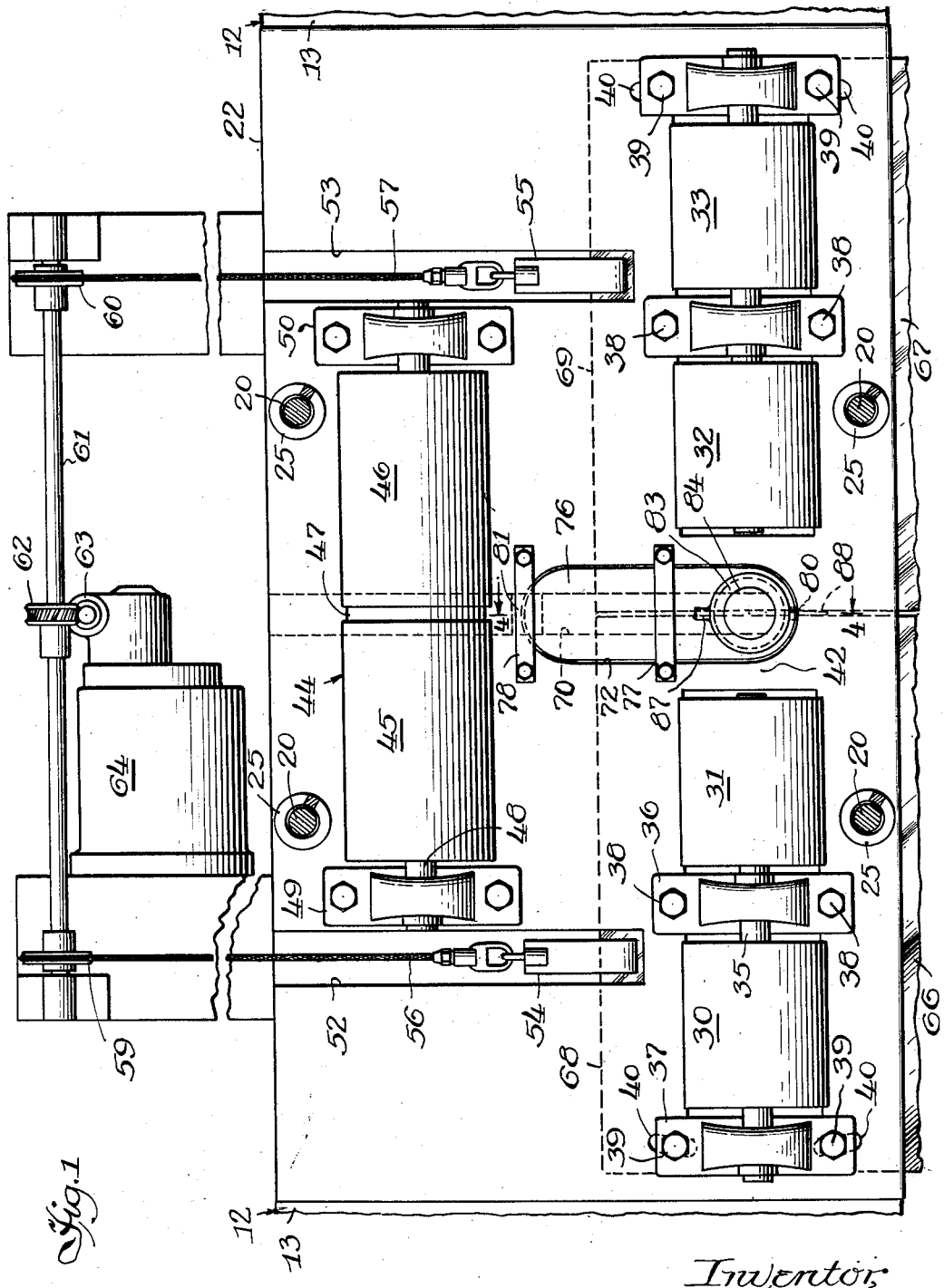
Figure 1 is a top plan view of a machine embodying the present invention, the sides of the bed plate being broken off and the top plate being cut away.

The machine comprises legs 10 and 11 (Fig. 2) of any desired construction, supporting bed plate 12. Bed plate 12 may have any desired shape and, as shown in Figure 1, is generally rectangular. Bed plate 12 has top face 13 which is generally flat.

Supported at the two sides of bed plate 12 are posts 15 (Fig. 2) extending upwardly from the bed plate. These posts support plate 17 at a distance above the bed plate. Plate 17 has threaded bosses 18 through which extend pins 20. Pins 20 are loose in bosses 18 and are anchored to a floating plate 22. Pins 20 have the top portions 23 threaded and are engaged by stop nuts 24. The drop of floating plate 22 is controlled by the position of nuts 24 with respect to the top surface of plate 17. Surrounding each pin 20 is compression coil spring 25 extending between the top surface of floating plate 22 and adjusting nut 26 cooperating with the threaded portion of boss 18.

It is clear that nut 26 may be adjusted around each pin 20 to compress the corresponding coil spring 25. Floating plate 22 is spring-pressed to a desired bottom position from which position the floating plate may be elevated against the compression of the various springs. As many such flexible suspensions may be provided as are necessary. As shown in Figure 1, there are four provided.

Across the front of floating plate 22 are rollers 30 to 33 extending transversely of the machine. Rollers 30 and 31 form one unit and rollers 32 and 33 form a second unit. Rollers 30 and 31 are mounted upon common shaft 35 supported in pillow blocks 36 and 37, respectively. Pillow block 36 is rigidly secured by bolts 38 to floating plate 22. Pillow block 37 is also secured by bolts 39 to plate 22. It will be noted that bolts 39 for pillow block 37 pass through slots 40 in the floating plate. These slots are inclined somewhat to each other and permit the horizontal adjustment of roller axis 35 around the center of pillow block 36. It is understood that bolts 38 for pillow block 36 will be sufficiently loose so that some movement of pillow block 36, with respect to the center of the block, is permitted. Thus, rollers 30 and 31 and axle 35 for the rollers may have a limited degree of adjustment in a horizontal plane.

Rollers 32 and 33 are similarly mounted. Floating plate 22 is cut-out below rollers 30 to 33 inclusive, so that each roller may extend through floating plate 22 and toward face 13 of bed plate 12 (Fig. 2). Between the bottoms of rollers 31 and 32 there is a space generally indicated by numeral 42 where the welding region is located. The roller axes intersect at a point above the weld region.

To the rear of rollers 30 to 33 inclusive is roller 44 consisting of parts 45 and 46 separated by grooved portion 47. Rollers 45 and 46 have shaft 48 mounted in pillow blocks 49 and 50. The axis of shaft 48 is transverse of the machine while grooved portion 47 of the rollers is located midway over the longitudinal axis of the machine to ride the weld line of the work. Floating plate 22 (Fig. 2) is cut away below rollers 45 and 46 so that these rollers may extend below the plate toward face 13 of bed plate 12.

Beyond pillow blocks 49 and 50 (Fig. 1) to the side are recesses 52 and 53 in bed plate 12. Floating plate 22 is also cut away to provide registering slots. Disposed in recesses 52 and 53 are alligator jaw clamps 54 and 55 attached to cables 56 and 57. Cables 56 and 57 extend rearwardly of the machine and extend over idlers 59 and 60. The free ends of cables 56 and 57 may be attached to weights or other suitable tension means. Idlers 59 and 60 are disposed upon shaft 61 carrying worm gear 62 meshing with worm 63. Motor 64 drives worm 63 so that cables 56 and 57 may be pulled rearwardly at any desired speed. Jaws 54 and 55 are of the alligator type or any other type so that they may grip the leading edges of sheets of metal therebetween for pulling. Thus, as shown, sheets 66 and 67 have leading edges 68 and 69 gripped by jaws 54 and 55. It is understood that sheets 66 and 67 are disposed between floating plate 22 and surface 13 of bed plate 12. Floating plate 22 is suitably adjusted so that the pressure of the various rollers on the plates has the value desired.

As previously pointed out, where tantalum is being welded, isolation of the welded material, while still hot, from other solid materials is essential to prevent alloying or contamination. To this end, plate 12 has recess 70 disposed along a median portion of the machine under the weld line. As shown, this recess is located midway between the sides of the machine. Recess 70 is wide enough and deep enough to clear those parts of the tantalum which ordinarily will be at high enough temperature for alloying with iron or whatever material is used for plate 12. Recess 70 begins at weld region 42 and extends rearwardly of the machine. The recess may extend to the very rear of the machine if desired, although the tantalum will be cooled below any danger point in a much shorter distance, as a rule.

Floating plate 22 is slotted at 72, this slot being over recess 70. Slot 72 extends from weld region 42 rearwardly of the machine and terminates in front of rollers 45 and 46. The side wall of plate 22 at slot 72 is stepped to provide ledge 73 (Fig. 4). Resting on ledge 73 is gasket 74 of asbestos or other material capable of withstanding heat. Cover plate 76, shaped to fit over gasket 74, closes the top of the space defined by slot 72 and recess 70. Cover plate 76 may be of any suitable material, as iron, copper, aluminum, bronze, or Vycor. Plate 72 is retained in position by transverse locking strips 77 and 78 bolted to floating table 22. At front part 80 of the cover plate, the side wall for slot 72 extends across the longitudinal axis of the slot so that perfect sealing between cover plate 76 and floating plate 22 is provided. At rear portion 81 (Fig. 1) of the cover plate, the gasket extends across slot 72. This provides a sliding seal when the tantalum passes rearwardly of the machine.

Cover plate 76 has a part cut out at 83 to accommodate welding hood 84 (Fig. 4) containing welding electrode 85. This electrode is preferably of tungsten, when tantalum is to be welded. No attempt is made to show details of the welding hood or electrode support since these are well known. The hood may be of Vycor, quartz, metal, glass, or any suitable material. Inert gas inlet 87 for the hood is provided. The hood is sealed to the cover plate in a suitable manner. Welding region 42 is within the hood (Fig. 1).

Carried by bed plate 12 in front of the welding region is tang 88. This tang extends high enough to reach the bottom of floating plate 22 and lies between the opposed tantalum edges. The tang width and its location in front of the point of welding (just beneath electrode 85) is such that the tantalum edges make an angle of about 1 degree. The tang prevents one tantalum edge from riding over the other tantalum edge. The tang may be of steel, quartz or aluminum bronze. The latter is preferred because of its low coefficient of friction with tantalum.

To use the machine, front rollers 30 to 33 inclusive are adjusted so that the axis of rollers 30 and 31 and axis of rollers 32 and 33 are slightly askew, with about 1° misalignment. This will place the projections upon table 12 of the respective roller axes substantially perpendicular to the edges of the tantalum to be welded. The intersection of the roller axes is at a point substantially above the point of welding. In case metal other than tantalum is worked on, it is possible to adjust the roller axes to alignment and eliminate tang 88. Metal sheets are hand fed to the point of welding. An arc is struck or initiated and the sheets are fed into the machine until the alligator jaws can grip the metal. The floating plate is adjusted to a desired pressure on the sheets and the motor drive on the machine will automatically feed the sheets past the welding point. It is understood that in the event tantalum is being welded, inert gas, as helium or argon, will be used as an enveloping atmosphere for the arc and also for that part of the tantalum which is above about 400° C. Hence in the design of slot 72 the length should be enough so that a welded joint part is cooled to about 400° C. when it reaches end 81 of the inert gas housing. As more fully explained in the application of Chester D. Mott, Serial No. 265,688, filed January 9, 1952, helium at a pressure of about 1 or 2 inches of water may be used. Enough leakage occurs to wash out gaseous impurities generated by the arc. The arc itself is preferably a direct current arc with the electrode as cathode.

However, the machine may be used for butt welding iron sheets or other common metals. When so used, the arc setup may be conventional as regards electrode material, polarity or type of current, or nature of the atmosphere within the enclosed region under cover plate 76. It is even possible to omit the cover plate if no protecting atmosphere is to be used.

The welding machine generally is made of conventional materials. Thus, the plates may be of iron or steel. Tantalum has a high coefficient of friction with iron and for that reason other materials may be desirable. Aluminum bronze, consisting of 95% aluminum and 5% copper, is particularly desirable in that respect as tantalum will not bind on such a surface. It is possible, therefore, to have the plates of aluminum bronze or have a surface covering of such material where tantalum is contacted. The same applies to the rollers, particularly rollers 30 to 33 inclusive. These latter rollers may have some slippage over the tantalum sheets. Tang 88 may also be of aluminum bronze. Other metals as copper, brass, bronze or aluminum may also be used. Such materials as ceramics, quartz or glass may similarly be used.

Instead of tank 88, the fixture disclosed in the copending application filed on the same day as this application by the same inventor, Serial No. 295,306, may be used.

What is claimed is:

1. A machine for butt welding of metal sheets, said machine comprising a flat stationary plate, a floating plate resiliently supported above said stationary plate, the sheets to be welded lying between said two plates, rollers carried by said floating plate, said floating plate having cutouts through which roller portions may extend for bearing against the top surfaces of the sheets to be welded, the axes of said rollers being generally perpendicular to the line of butt welding, a welding means secured to said floating plate, said floating plate having a cutout at the weld region for providing access of the welding means to the work, and means for guiding two metal sheets between the plates so that the edges to be butt welded pass under the welding means.

2. A machine for butt welding of sheets, said machine comprising a flat stationary plate, a floating plate resiliently supported above said stationary plate, the sheets to be welded lying between said two plates, rollers carried by said floating plate, said floating plate having cutouts through which roller portions may extend for bearing against the top surfaces of the sheets to be welded, said two plates having clearances for accommodating the welld line, a housing carried by said floating plate, said floating plate having a cutout at the housing so that the housing interior communicates with the weld line clearances, a welding means carried within said housing, and means for guiding two metal sheets between the plates so that the edges to be butt welded pass through the weld region under the welding means and along the plate clearances.

3. The machine according to claim 2, wherein means are provided for guiding the sheets toward the weld region so that the sheet edges are at an angle to each other and wherein means are provided for adjusting the axes of certain of said rollers so that they are substantially perpendicular to the edges of the sheets to be welded, said rollers having their axes intersecting at a point located substantially above the weld region.

4. The machine according to claim 3, wherein said means for feeding the sheets at an angle comprise a tang disposed between the plates and ahead of the weld region, said tang being so dimensioned and positioned as to provide the desired angle of feed between the sheets.

5. A machine for butt welding of sheets, said machine comprising a flat stationary plate, a floating plate resiliently supported above said stationary plate, the sheets to be welded lying between said two plates, rollers carried by said floating plate, said floating plate having cutouts through which roller portions may extend for bearing against the top surfaces of the sheets to be welded, means for adjusting the axes of certain of said rollers to vary the angle therebetween, the axes of said adjustable rollers intersecting at a point substantially above the weld region, a welding means supported on said floating plate at said weld region, said floating plate having a cutout for providing access of the welding means to the work, means for guiding two metal sheets between the plates so that the edges to be butt welded pass under the welding means and means cooperating with the leading edges of the sheets for pulling said sheets through the machine and past the weld region.

6. A machine for butt welding sheet material, said machine comprising a flat stationary plate, a floating plate above said stationary plate, resilient means for supporting said floating plate at a predetermined low position above which said floating plate may be moved against the force of the resilient supporting means, the sheets to be welded lying between said two plates, said machine having a front and rear with the work sheets being adapted to be moved during welding from the front toward the rear of the machine, rollers carried by said floating plate, certain of said rollers lying near the front of the machine with the roller axes extending generally perpendicular to the line of travel of the work, other rollers being disposed near the rear of the machine with the axes parallel generally to the axes of the first named rollers, said machine having a median portion thereof extending from the front to the rear of the machine along which the weld line is adapted to lie, the front rollers being disposed on opposite sides of said median portion of the machine to leave a welding region between said rollers, the rear rollers being secured across the median portion of the machine, said floating plate having cutouts through which the lower part of the rollers may extend for bearing against the top surfaces of the sheets, said stationary plate having a recess along the median portion thereof from a point in front of the welding region to a point near the rear of the machine, said floating plate having a cooperating opposed recess along the median portion thereof, the floating plate at the welding region having a cutout, a welding shield and electrode carried by said floating plate at said cutout and adapted to generate a welding arc at the work, said floating and stationary plates having the material thereof free of the work in the region of the weld region and in the neighborhood of the weld line for a distance toward the rear of the machine and means for feeding said sheets from the front of the machine toward the rear of the machine.

7. The machine according to claim 6, wherein said floating plate has a portion cut out and has a housing above said cutout to provide the recess for cooperating with the recess in the stationary plate.

8. The machine according to claim 6, wherein a tang is disposed between said two plates in front of the welding region, said tang being dimensioned to guide opposed sheet metal edges toward the welding region at an angle of about 1 degree.

9. The machine according to claim 6, wherein the front rollers are secured in bearing blocks and wherein means are provided for adjusting said bearing blocks so that the axes of said front rollers may be moved into or out of alignment.

10. A machine for butt welding sheets of tantalum or the like, said machine comprising a flat stationary plate having a front and rear with the work sheets being adapted to move from the front to the rear of the plate, a floating plate above said stationary plate, means for resiliently biasing said floating plate to a predetermined bottom position above said stationary plate, said machine having a median portion extending from the front of the plate to the back along which the weld line lies, rollers secured to said floating plate near the front edge thereof, there being at least one roller on one side of the median portion and another roller on the other side of the median portion, the space between rollers being a welding region, additional rollers carried by said floating plate near the rear of the machine, said additional rollers having portions on each side of the median portion of the machine, the axes of all of the rollers being generally parallel to the front of the machine, said stationary plate having a recess in the top face thereof from a point in front of the welding region to the rear of the machine, the floating plate having a cutout along the median portion of the machine from a point somewhat forward of the welding region to a point near the rear of the machine but in front of the additional rollers, said floating plate also having cutouts for the bottoms of said rollers to permit said rollers to bear against the top surfaces of the sheets, a housing carried by said floating plate above the median portion cutout, a welding shield and electrode carried by said floating plate and said housing above the welding region, the welding shield and housing cooperating with the two plates to form an enclosed region within which the tantalum edges during welding and while they are hot may be free of other physical material to prevent contamination, said welding torch being adapted to be supplied with an inert gas to provide a protecting atmosphere for the tantalum, means for adjusting the front rollers so that their axes may be moved out of alignment and means disposed between the two plates and located in front of the welding region for guiding the edges of the sheet tantalum toward the welding region at an angle.

11. The machine according to claim 10, wherein means are provided for gripping the leading edges of the tantalum sheets and pulling them toward and beyond the rear of the machine.

12. The machine according to claim 11, wherein said means for pulling the leading edges of the metal comprise a pair of clamps attached to cables and wherein said plates are recessed to accommodate said clamps to permit the sheet material to move between the plates.

13. The machine according to claim 10, wherein at least the front rollers are of aluminum bronze to reduce friction with respect to the tantalum.

GEORGE A. MOTT.
*Executor of the last will and testament of Chester Mott, deceased.*

References Cited in the file of this patent
UNITED STATES PATENTS

| Number | Name | Date |
|---|---|---|
| 2,147,868 | Von Henke | Feb. 21, 1939 |